Oct. 20, 1964    J. G. REDMOND    3,153,365
APPARATUS TO TEACH MUSIC
Filed April 2, 1962    4 Sheets-Sheet 1
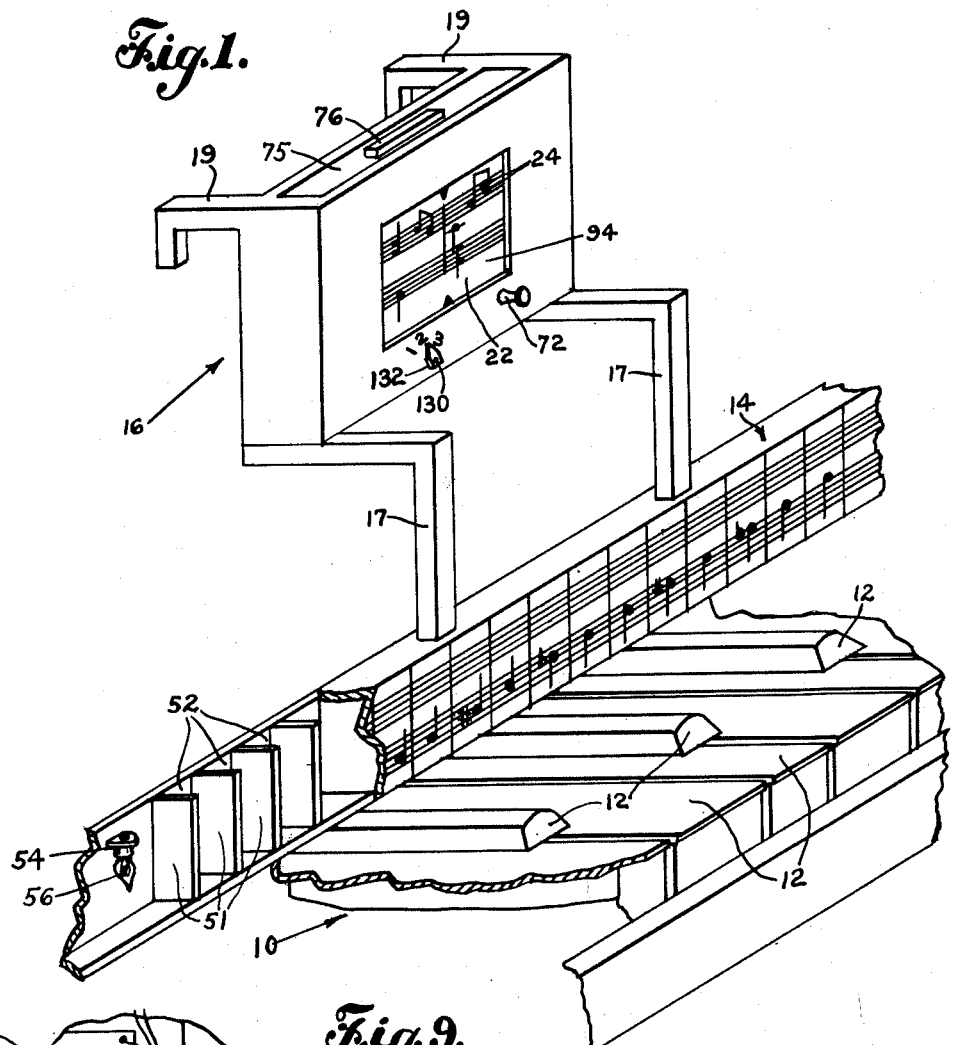
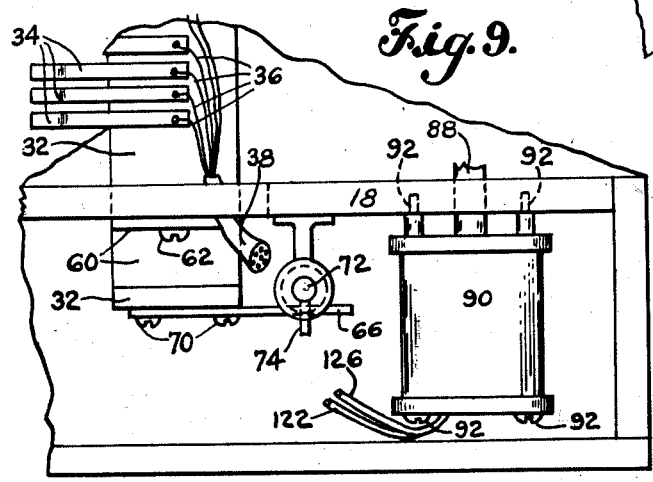
INVENTOR.
John G. Redmond
BY Harold E. Cole
Attorney

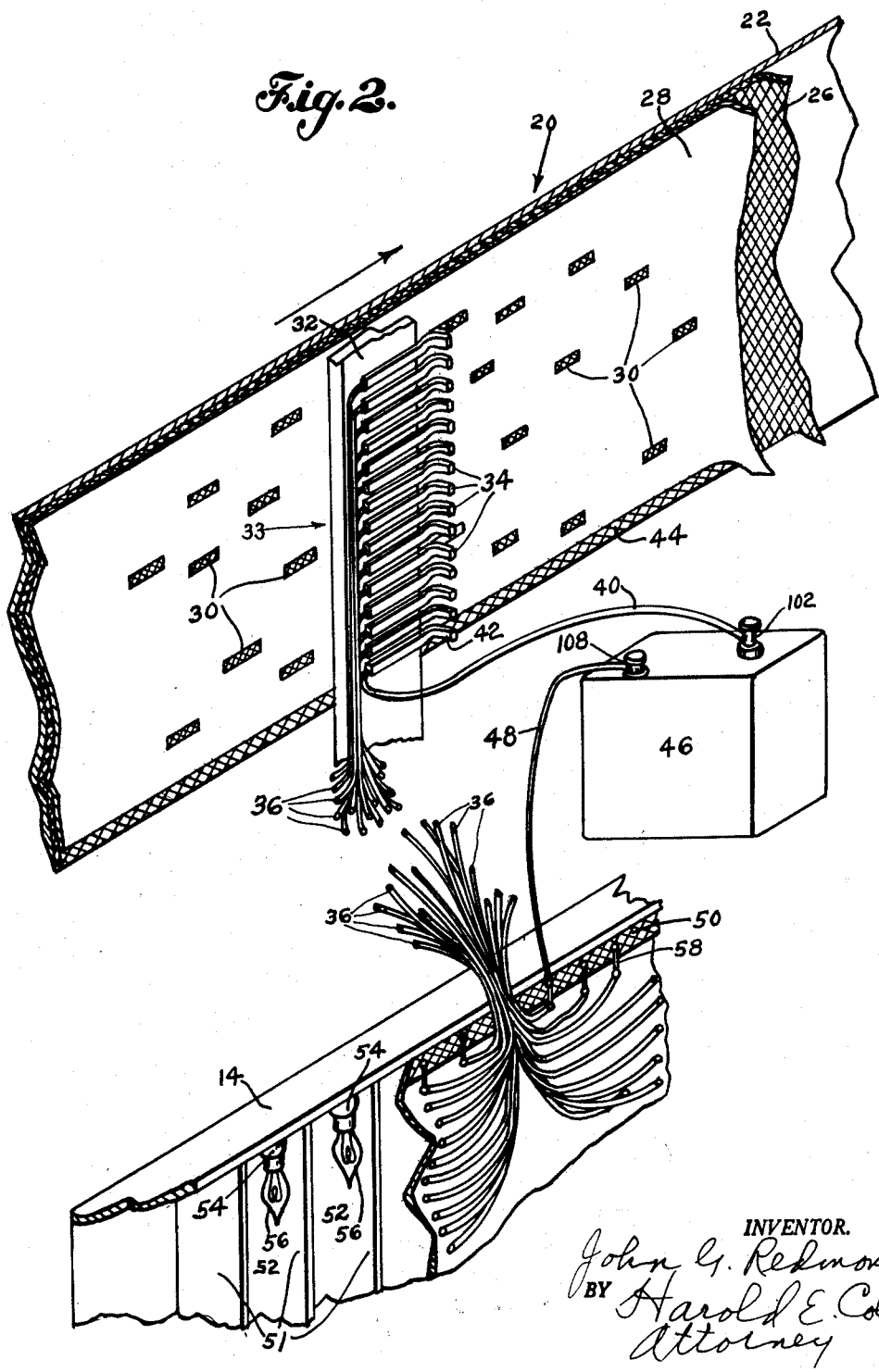

INVENTOR.
John G. Redmond
BY Harold E. Cole
Attorney

Oct. 20, 1964 J. G. REDMOND 3,153,365
APPARATUS TO TEACH MUSIC
Filed April 2, 1962 4 Sheets-Sheet 4
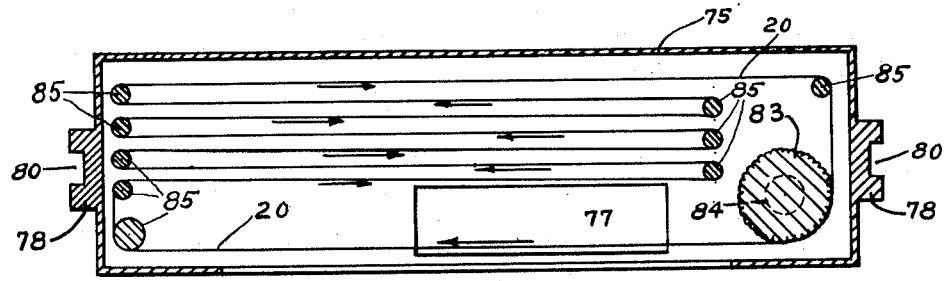
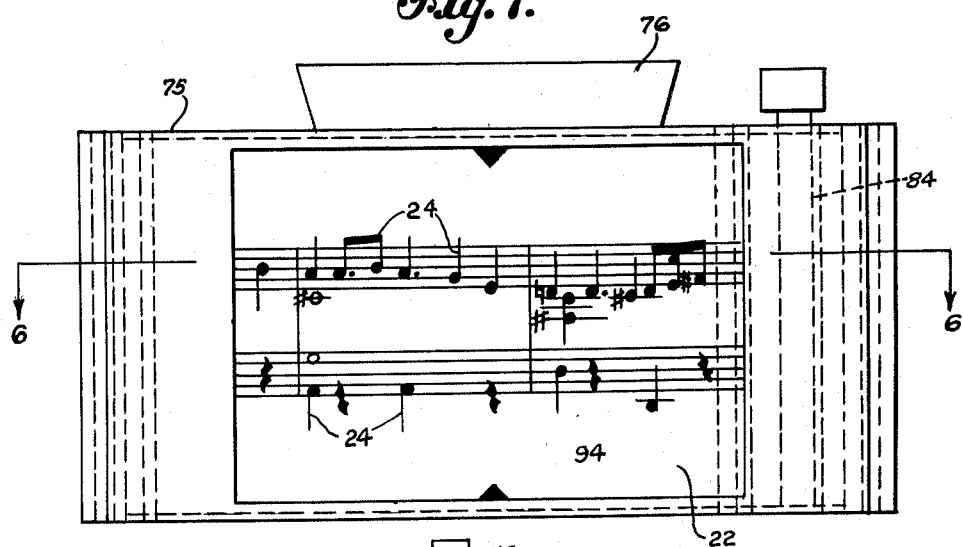
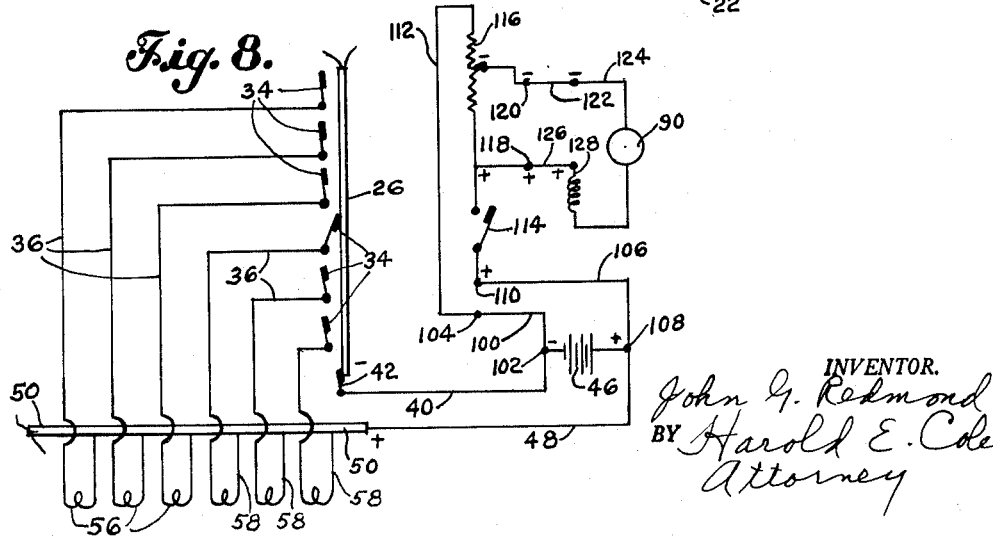
INVENTOR.
John G. Redmond
BY Harold E. Cole
Attorney

3,153,365
APPARATUS TO TEACH MUSIC
John G. Redmond, 1 Nassau Drive, Winchester, Mass.
Filed Apr. 2, 1962, Ser. No. 184,219
3 Claims. (Cl. 84—478)

This invention relates to apparatus to teach music, using it in combination with a keyboard instrument.

One object of my invention is to provide such apparatus that, as it operates, shows the user what keys of the keyboard to play, thus enabling a person to play a keyboard instrument without prior training and to become proficient therein within a relatively short period of time.

Another object is to provide such apparatus that automatically sheds light on one key and then another so the user can thereby follow the music and strike the keys opposite the lighted keys as the latter appear, to thus play the music correctly even though it is new to him.

A further object is to provide such apparatus that serves as a guide of timing and tempo so that a beginner, as well as a novice musician, by making use thereof, can become proficient in such qualities by actually playing notes in correct timing and tempo.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

FIG. 1 is a fragmentary, perspective view showing my apparatus with part of a piano keyboard.

FIG. 2 is a fragmentary, perspective, rear view, partly diagrammatic, of my apparatus, omitting the piano keyboard.

FIG. 6 is a sectional view taken on the line 6—6 of FIG. 7.

FIG. 7 is a front elevational view of the music roll magazine.

FIG. 8 is a diagram of the electrical circuit used in my apparatus.

FIG. 9 is a fragmentary, side elevational view showing the shelf and mechanism shown in FIG. 5.

Figure 3:
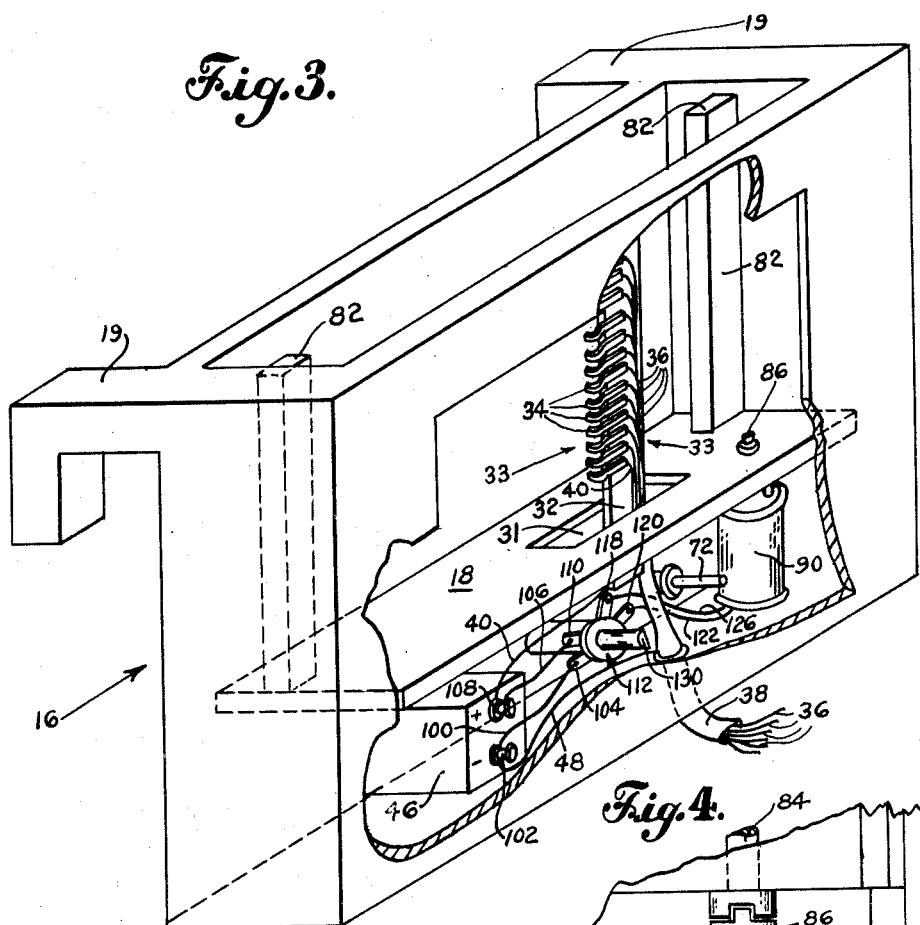
FIG. 3 is a perspective view of my music roll support and showing details of illuminating mechanism associated therewith omitting the connectors and electrical wiring to the musical instrument.
Figure 4:
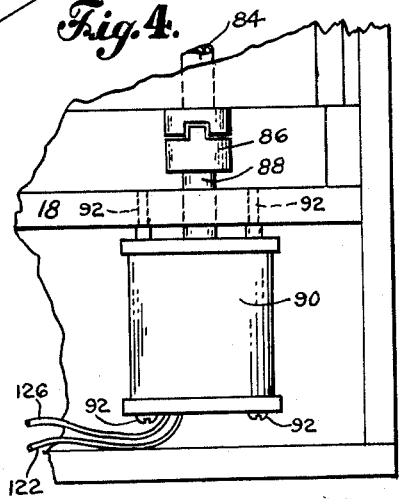
FIG. 4 is a fragmentary, side elevational view showing details of the driving mechanism for the music roller.

As illustrated, a musical instrument such as a piano 10 has the usual keys 12 or playing members. An illuminator member or support shown as an enclosure member 14 for my music reader is suspended angularly from a music roll support or cabinet 16 by means of connectors 17 which may be hollow to receive electrical wires to said enclosure member 14. Said cabinet 16 has a shelf 18 therein, and also angular arms 19 which may be attached to a stand or the like, not shown, such as a music rack.

Said music roll cabinet 16 has within it a musical note carrier 20 shown as a music roll. It is formed of three layers, one being an outside or exposed layer 22 formed of sheet paper or other electrically insulating material, which preferably insulates to the extent of six volts. On the visible surface of said layer 22 are musical notes or connotations 24. Then there is an intermediate or electrically conductive layer 26 formed of a sheet of aluminum foil or similar conductive material that runs continuously along the full length of said carrier 20. The next or third layer 28 is insulating material similar to said layer 22, and it has holes or slots 30 that expose said conductive layer 26. The positions of said slots determine the piano keys that will be illuminated, that is, on which light is shed, and their lengths determine the time the illumination will continue and thus the time a note is to be played by pressing a said key 12. Said notes 24 are positioned to appear opposite a corresponding slot 30 that is representative thereof.

Attached to said cabinet 16, and extending through a slot 31 in said shelf 18 is a contact member 33 having an insulating support 32 that supports electrical contact fingers 34 and a finger 42 attached thereto as by an adhesive. These fingers 34 are individually positioned to enter said slots 30 when the latter are moved to positions opposite said fingers, thus closing an electrical circuit and providing illumination opposite one of the piano keys, as later explained.

Insulated wires 36 are connected to contact fingers 34, there being one to each finger, and they are grouped to form a cable having a cover 38. An additional insulated wire 40 is connected to a common conductor finger 42 which latter contacts the exposed edge 44 of said conductive layer 26. Said insulated wire 40 is also connected to a power supply such as a battery 46. Another insulated wire 48 also connects with said battery 46 and with another common conducting member 50 attached to the enclosure member 14.

Partitions 51 divide said enclosure member 14 into apartments or stalls 52 which are directly opposite, and the same size in width as one key of the piano or instrument keyboard. Said wires 36 extend from said contact fingers 34 to small sockets 54 for electric light bulbs 56, which sockets are attached to said enclosure member 14, there being one socket and bulb for each said stall 52. The piano key opposite each said section is correlated with a specific contact finger 34 that in turn is correlated to the appearance of a specific written musical note 24 represented on said layer 28 by a said slot 30. Consequently the pupil will play the piano correctly by striking the key that is illuminated.

One terminal of each said socket 54 is connected to said conducting member 50 by an insulated wire 58.

Any one of said bulbs 56 will glow when an electric circuit is completed between a contact finger 34 and the ground contact finger 42. Thus an electrical circuit is established whenever said conductive layer 26 is exposed to a contact finger 34, which illuminates one of said bulbs 56. The front or exposed surface of said enclosure member 14 is translucent so that light from said bulbs 56 will pass through.

Said contact insulator strip 32 is adhesively attached to two brackets 60 and 61 each of which has an arcuate slot therein 60a and 61a respectively. Screws 62 loosely extend through said slots 60a and 61a and enter said cabinet shelf 18 thereby permitting rotative movement of said brackets which in turn moves said finger support 32 as shown in said FIG. 5. The latter has an extension or arm 66 having a slot 68 therein, which arm is fastened to said support 32 by screws 70.

Figure 5:
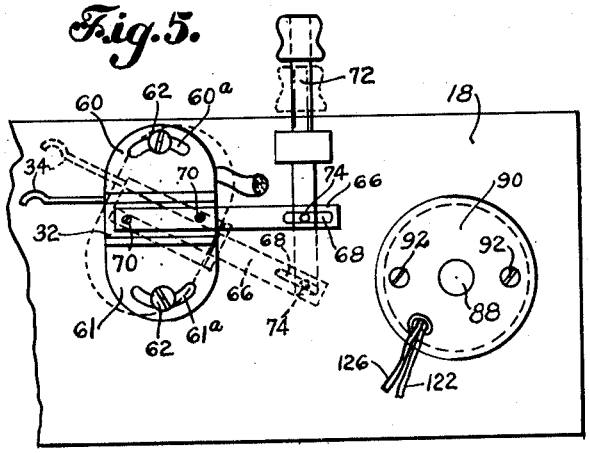
FIG. 5 is a bottom plan view showing the shelf of the music roll support with mechanism attached thereto by which the contact fingers are moved into contact with the music carrier, the dash lines showing a finger in contacting position.

A push-pull lever 72 actuates support 32 by means of a pin 74 projecting therefrom into said slot 68. When said lever 72 is actuated, said brackets together with said support 32, are rotatively moved to thereby move said fingers 34 to or away from contact position, as illustrated in FIG. 5.

A music roll receptacle or magazine 75 has a handle 76 and an opening 77 in the bottom to permit entry of support 32. This magazine 75 is guided into said cabinet 16 by guides 78 each having a slot 80 therein into which enter projecting members 82 on said cabinet 16. A music roller 83 has a driven spindle 84 that engages a driver member 86 attached to an upwardly extending shaft 88 of an electric motor 90 that may be powered from said battery 46, and is attached to said shelf 18 by screws 92. A well known switch 114 and voltage divider 116 in the electrical circuit are connected to and control the operation and speed of said motor, as later described. Said musical note carrier 20 moves continuously over said roller 83 and well-known take-up spindles 85 that are mounted in said magazine 75.

A clear plastic window 94 in said cabinet 16 provides a bearing surface for said musical carrier 20 as it moves, with said contact fingers 34 engaging it.

If a student is not interested in learning to read music, said notes 24 may be omitted or ignored, and he merely plays the keys when illuminated, thus learning to play without music.

In FIG. 8 of the drawings I show the two electrical circuits needed. Said wire 40 connects with a negative battery post 102 and with said ground contact finger 42, which makes contact with said exposed edge 44 of conductive layer 26 of the musical note carrier 20 when an electrical circuit is closed. The contact fingers 34 contact said layer 26 whenever a finger 34 enters a slot in the musical note carrier 20. Said connecting wires 36 lead from the contact fingers 34 to the electric light bulbs 56 as explained. Said bulbs are also connected to said ground member 50 which latter is connected to a battery terminal post 108 by said wire 48. This completes the circuit between the electric light bulbs and contact fingers 34, which circuit is open when there are no fingers 34 in said slots of the musical note carrier 20, or if the latter is removed.

The electrical circuit to said motor 90 includes a wire 100 that connects a negative battery terminal 102 with a control unit contact 104. A wire 106 connects a positive terminal 108 with a control unit contact 110. A control unit 112 includes a switch 114 and a voltage divider 116. The output of the voltage divider appears at contacts 118 and 120. A wire 122 connects a control unit contact 120 to a negative wire 124 of said motor 90. A wire 126 connects said control unit contact 118 to a positive motor wire 128. When the switch 114 is closed by rotating a control unit shaft 130 by a knob 132, the current flows through said motor 90. The rotational position of said shaft 130 determines the voltage delivered to said motor 90 through said voltage divider 116.

What I claim is:

1. Apparatus to teach music comprising a musical instrument having movable keys, an illuminator member supported by said instrument having illuminating means adapted to individually illuminate said keys, a musical note support associated with said instrument embodying a musical note carrier having an endless and solid, electrically conductive layer and another endless layer of electrically insulating material having holes therethrough exposing portions of said conductive layer, means to actuate said note carrier, a contact member embodying an electrically insulating support extending crosswise of said layers supported by said musical note support, a plurality of contact fingers attached to said latter insulating support and adapted to enter said other layer holes when opposite thereto and contact said conductive layer, electricity conducting means connected to said contact fingers and to said illuminating means and adapted to extend and connect to a source of electrical supply whereby upon contact of a said contact finger with said conductive layer an electrical circuit is established whereby said illuminating means illuminates a said musical instrument key.

2. Apparatus to teach music comprising a musical instrument having movable keys, an illuminator member supported by said instrument having illuminating means adapted to individually illuminate said keys, a musical note support associated with said instrument embodying a musical note carrier having a solid layer of electrically insulating material on which musical notes appear, an intermediate electrically conductive solid layer and a third layer of electrically insulating material having holes therethrough exposing portions of said intermediate layer, means to actuate said note carrier, a contact member embodying an electrically insulating support extending crosswise of said layers supported by said musical note support, a plurality of contact fingers attached to said latter insulating support and adapted to enter said third layer holes when opposite thereto and contact said conductive layer, electricity conducting means connected to said contact fingers and to said illuminating means and adapted to extend and connect to a source of electrical supply whereby upon contact of a said contact finger with said intemediate conductive layer an electrical circuit is established whereby said illuminating means illuminates a said musical instrument key.

3. Apparatus to teach music comprising a musical instrument having movable keys, an illuminator member supported by said instrument having a plurality of stalls opposite said keys, illuminating means at said stalls supported by said illuminating member, a musical note support supported by said illuminating member, and extending above and rearwardly thereof associated with said instrument embodying a musical note carrier having a solid layer of electrically insulating material on which musical notes appear, an intermediate, electrically conductive solid layer and a third layer of electrically insulating material having holes therethrough exposing said intermediate layer, said layers extending upwardly in position of use and being movable laterally, means to actuate said note carrier layers laterally, a contact member embodying an electrically insulating support extending crosswise of said layers movably supported by said musical note support, a plurality of contact fingers attached to said latter insulating support and extending angularly thereto and adapted to enter said third layer holes when opposite thereto and contact said conductive layer, electricity conducting means connected to said contact fingers and to said illuminating means and adapted to extend and connect to a source of electrical supply whereby upon contact of a said contact finger with said intermediate layer an electrical circuit is established whereby said illuminating means illuminates a said musical instrument key.

References Cited in the file of this patent

UNITED STATES PATENTS

| | | |
|---|---|---|
| 758,861 | Shaffer | May 3, 1904 |
| 941,433 | Trist | Nov. 30, 1909 |
| 1,324,274 | Schantz | Dec. 9, 1919 |
| 2,223,009 | Rupp et al. | Nov. 26, 1940 |